United States Patent [19]
Fritz

[11] 3,882,957
[45] May 13, 1975

[54] VEHICLE ROLL-OVER PROTECTION DEVICE

[75] Inventor: Charles H. Fritz, Woodbury Heights, N.J.

[73] Assignee: SGL Industries, Inc., Haddonfield, N.J.

[22] Filed: June 20, 1974

[21] Appl. No.: 481,340

[52] U.S. Cl............... 180/104; 307/10 R; 340/52 H
[51] Int. Cl. ............................................. B60r 18/02
[58] Field of Search ......... 180/104, 103; 200/61.45, 200/61.47, 61.52; 307/10 R, 10 BP; 335/268; 340/52 H

[56] References Cited
UNITED STATES PATENTS

| | | | |
|---|---|---|---|
| 2,174,846 | 10/1939 | Soulat | 200/61.52 X |
| 2,481,176 | 9/1949 | Taylor et al. | 307/10 R |
| 2,581,338 | 1/1952 | LaRoza | 340/52 H |
| 2,766,346 | 10/1956 | Valdes | 200/61.52 |
| 2,806,150 | 9/1957 | Poznik | 307/10 BP |
| 3,021,429 | 2/1962 | Starck | 307/10 BP |
| 3,215,792 | 11/1965 | Lawyer | 307/10 R X |
| 3,229,109 | 1/1966 | Wilson | 180/104 |
| 3,460,081 | 8/1969 | Tillman | 335/268 X |
| 3,743,849 | 7/1973 | Iwata | 307/10 R |
| 3,772,643 | 11/1973 | Dodd | 180/104 X |

*Primary Examiner*—Kenneth M. Betts
*Attorney, Agent, or Firm*—Cushman, Darby & Cushman

[57] ABSTRACT

A vehicle engine cutoff means for cutting off the primary electric power source and for fuel supply thus preventing the engine from running and thus damaging itself should the vehicle overturn or tilt more than a certain amount. A module is provided for containing a tilt switch, pilot relay, and terminal connection components of the cutoff means. The cutoff means may be mounted within the engine compartment adjacent the battery in the battery ground connection. A main solenoid when energized provides completion of the battery ground connection; the pilot relay controls operation of the main solenoid. Of two opposed coils in the pilot relay, one is actuated by the "tilt" switch, while the other is energized by movement of a 3-position spring-biased operating switch to the "reset" position. The battery ground connection can be broken by moving the operating switch to the "off" position. Other engine cutoffs may be used instead of or in addition to the battery ground connection cutout.

11 Claims, 5 Drawing Figures

PATENTED MAY 13 1975

VEHICLE ROLL-OVER PROTECTION DEVICE

BACKGROUND AND SUMMARY OF THE INVENTION

The invention relates to means for protecting vehicles in the event of overturn. When a vehicle overturns or tilts more than a specific amount, should the engine remain running it is almost certain that damage will result either from engine oil starvation or fire caused by fuel being ignited by the vehicle electrical system. This problem is especially troublesome in the case of large trucks, earthmoving, and construction vehicles that may operate under severe conditions in rough terrain.

The device according to the present invention prevents vehicle damage resulting from overturn by cutting out a system or systems vital to the operation of the vehicle. According to the present invention, a latching pilot relay and a mercury tilt switch for the present device are mounted on a printed circuit board having a plurality of terminals thereon for facilitating connection between the pilot relay and mercury switch and between these two components and the rest of the components of the device. The module formed by the assembly of the latching pilot relay, mercury switch, and printed circuit board may be potted in rigid epoxy or the like, and mounted in any desired place in a vehicle. Unlike prior art devices, such as U.S. Pat. Nos. 2,766,346, 2,192,262, and 2,174,846, the module of the present invention allows great versatility in making connections to various other components of the rollover protection device, and to engine systems which it controls, allows easy installation of the device within any existing vehicle, allows versatility in the exact placement of the device within the vehicle, and will not be harmed or rendered inoperative in any way even under the most severe operating conditions.

The module of the present invention may provide for selective make-and-break of the battery ground connection and/or other engine cutoff systems such as the fuel supply and the electrical system. A main solenoid (or solenoids) preferably provides for the actural make-and-break, and the main solenoid is controlled by the module pilot relay to allow a lower rating for the module components while still providing the heavy-duty operation needed to make-and-break a battery ground connection. A three-position operating switch controls the other components of the device, and an indicator light may be provided.

It is an object of the present invention to provide an improved vehicle engine cutoff means for preventing engine damage upon vehicle overturn.

It is a further object of the present invention to provide a module assembly for an engine cutoff means.

It is a further object of the present invention to provided an engine cutoff means that is simply and easily installed yet reliable and fail-safe in operation.

These and other objects of the invention will become clear from an inspection of the detailed description of the invention and the appended claims.

DETAILED DESCRIPTION OF THE INVENTION

Figure 1:
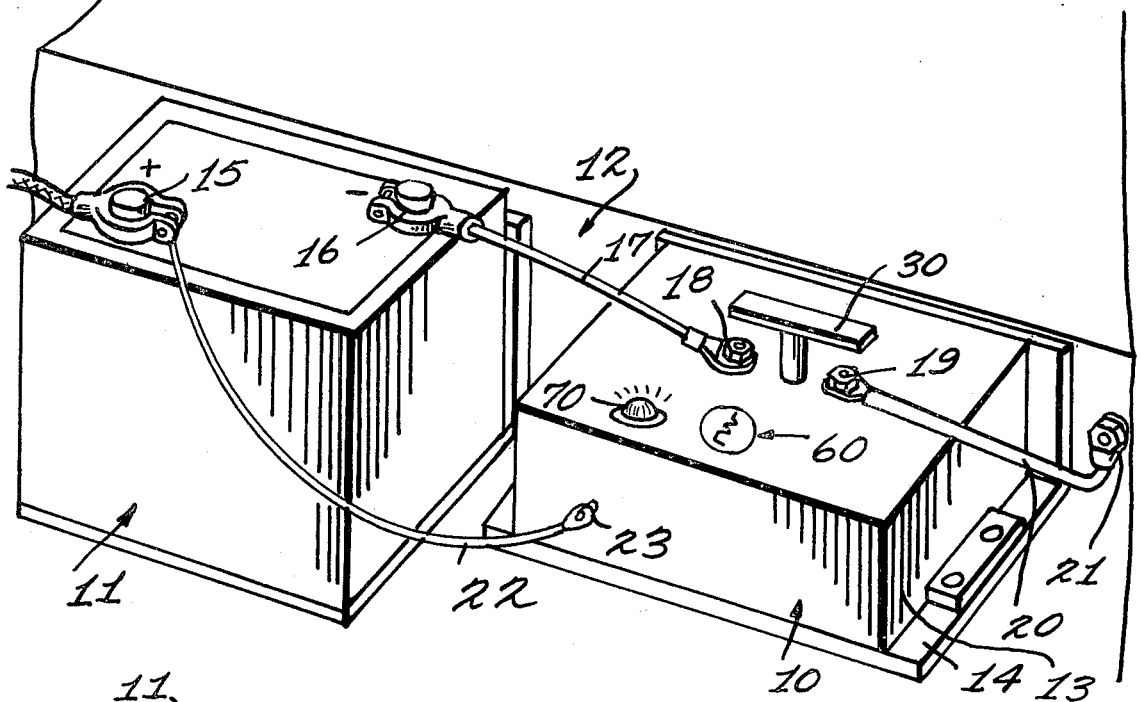
FIG. 1 is a fragmentary perspective view of a vehicle engine compartment having an exemplary engine cutoff means according to the teachings of the present invention.

In FIG. 1, an engine cutoff means according to the teachings of the present invention is shown generally at 10. The engine cutoff means may be connected in the battery ground circuit of a battery (or a number of batteries) 11, and is shown mounted near the battery 11 in vehicle engine compartment 12. All of the components of the engine cutoff means 10 may be located within a housing, such as housing 13, which may be mounted — as by a bracket 14 — to a wall of the vehicle engine compartment 12. The housing 13 may have heavy duty terminals 18, 19 mounted on the top thereof. Terminal 18 may be connected to negative battery terminal 16 via wire 17, while terminal 19 may be connected to a battery ground 21 via wire 20. Although shown connected in a negative ground system in FIG. 1, it is obvious that the cutoff means 10 could instead be located in a positive ground system, the fuel supply system, or the electrical system. The bridging contact 30 of engine cutoff means 10 either makes or breaks the battery ground connction by bridging or being spaced from terminals 18 and 19.

Terminal 23 on housing 13 is connected to a source of electrical power, such as to positive battery terminal 15 by wire 22, and supplies the power for operating the engine cutoff means 10. No other connections need be made from the engine cutoff means 10 to the rest of the engine except for a wire 53 for connection to optional ignition and fuel supply cutoffs, as will be further explained. Shown on top of the housing 13 is a 3-position operating switch, shown generally at 60, and an indicating means, such as an indicator light 70. The operating switch 60 has the working components thereof located within the housing 13, and is preferably key-operated. The indicator light 70 may be completely enclosed within the housing 13 and have a transparent cover portion adjacent to it, or it may be mounted on the housing 13 with its terminal connections within the housing. The operating switch 60 and indicator light 70 need not be located on top of the housing, but may be located on any other surface of the housing or remote therefrom, such as in the vehicle operator's compartment.

Figure 2:
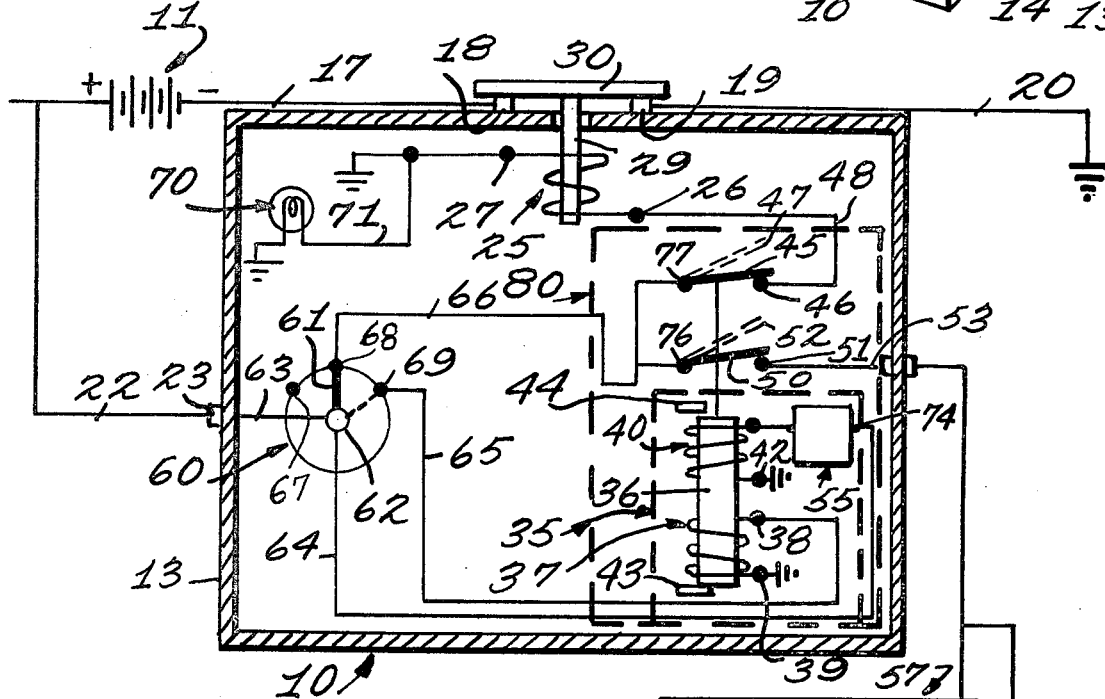
FIG. 2 is a diagrammatic view of an exemplary engine cutoff means according to the present invention during normal vehicle operation.

FIG. 2 diagrammatically shows the components of the engine cutoff 10 located within the housing 13 during normal engine operation. A movable contact, such as the bridging contact 30 — which provides for engine cutoff when spaced from terminals 18 and 19 and allows normal operation of the engine when it bridges them — is preferably normally biased to the break or open position by any conventional means [such as a spring between contact 30 and the top of module 13]. An operating portion 29 of contact 30 extends into the housing 13. When the main solenoid 25 of the engine cutoff 10 is energized, it acts upon operating portion 29 and pulls the contact 30 into the make or closed position wherein it bridges terminals 18 and 19. Terminal 26 of main solenoid 25 is connected to a power source, as will be further explained, while terminal 27 is connected to indicator light 70 and ground.

Figures 4A, 4B:
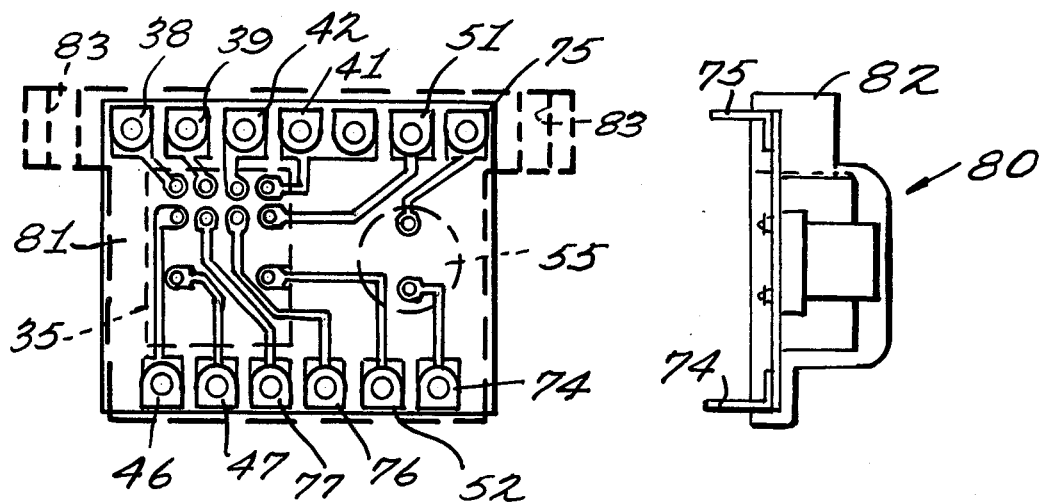
FIGS. 4a and 4b are front and side views of the module according to the present invention.

The energization of main solenoid 25 is controlled by a pilot relay, shown generally at 35. The pilot relay 35 is mounted along with a tilt switch 55 on a printed circuit board 81 (see FIG. 4a) to comprise a module assembly 80 of the present invention. The module 80 has the terminal connections (see terminals 74 and 75 in FIG. 4b) extending therefrom, for easy connection to other components, and the components of the module may be encapsulated in an opaque epoxy potting compound 85 or the like. Mounting surface 82 with holes 83 therein may be provided to facilitate mounting of the module 80 within the housing 13 or at any other desired location. While it is convenient to mount all the components of the cutoff means together within the housing 13, it is to be understood that they could be mounted separately and/or at other locations. For instance, the operating switch 60, indicator light 70, and module 80 could be mounted within the vehicle operator's compartment while the main solenoid 25 was within the engine compartment. Also, the main contacts 18 and 19 and the solenoid bridging contact 30 could be mounted within the housing 13 instead of exterior thereof, grommetted holes being provided in the housing 13 walls for receipt of the cables 17 and 20 or the like.

The pilot relay 35 includes an armature 36 and opposed first and second solenoids 37 and 40 respectively. The armature 36 actuates relay contact 45 — and may also actuate a second relay contact 50 — and is of the type that is automatically latched in either of the two positions to which it is moved by the solenoids 37, 40. Stops 43 and 44 may be provided for stopping the movement of the armature 36.

Figure 3:
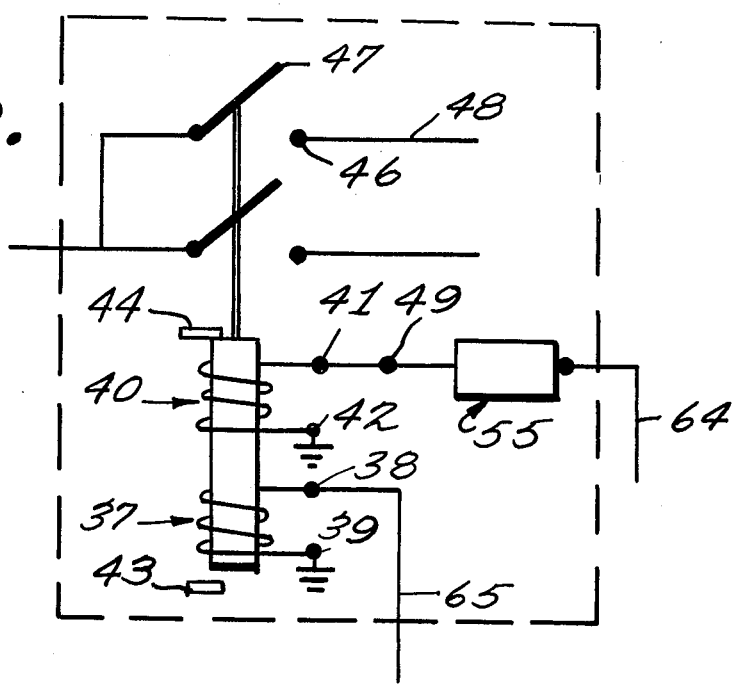
FIG. 3 is a fragmentary diagrammatic view of the module assembly of the engine cutoff means according to the present invention when the engine has been cut off.

The first solenoid 37 of pilot relay 35 has one terminal 38 thereof connected to a source of power, as will be further described, and the other terminal 39 connected to ground. The second solenoid 40 has one terminal 42 connected to ground, and the other terminal 41 connected to a terminal 75 of a tilt actuated switch 55, which in turn is connected to a source of power as will be further described. Once the coil 37 has been energized and the armature 36 is latched into the position shown in FIG. 2, the relay contact 45 is brought into contact with terminal 46 and thereby provides current from a source to main solenoid 25 through wire 48. When the second coil 40 is energized and the armature is latched into the position shown in FIG. 3, the relay contact 45 is moved into contact with dummy contact 47, and the circuit to main solenoid 25 is broken. As mentioned above, the second solenoid 40 is controlled by a tilt switch 55. The tilt switch 55 is actuated when the vehicle is tilted more than a certain amount. When actuated, it supplies current from battery 11 through wire 64 to terminals 74 and 75 and in turn to coil 40, which in turn cuts off the current to main solenoid 25 and thereby opens the battery ground connection and other engine systems, cutting off the engine. Although shown connected to power supply contact 62, wire 64 could be connected directly to terminal 23 or any other constant supply of current. The tilt switch 55 preferably is a mercury switch designed to close a pair of contacts when tilted more than a certain amount, such as 50° or 65°, from the vertical in any direction. Since the tilt switch 55 is encapsulated within module 80, and since the module 80 is rigidly attached to the vehicle, when the vehicle tilts it will tilt module 13 and subsequently the switch 55. False triggering of the mercury switch under normal shock and vibration may be prevented by a built in damping device, and provision in module 80 prevents damage thereto. Although a mercury switch as described above is preferred, other types of tilt switches are suitable.

In addition to controlling the main solenoid 25, pilot relay 35 may also control other cutoff means for insuring positive cessation of all engine operation. This may be provided by relay contact 50 movable between live contact 51 and dummy contact 52. When contact 50 is moved into engagement with contact 51, power from a source may be provided via wire 53 to accessory engine cutoff means, such as fuel cutoff 57 and electrical cutoff 58. As shown in FIG. 2, the accessory engine cutoffs are located outside the housing 13, but they may be located within the housing 13 instead; this would merely necessitate running portions of the electrical circuit and fuel line into housing 13. In fact, main solenoid 25 may be arranged so that it operates the accessory cutoffs, thereby eliminating the need for the relay contact 50 and associated terminals.

Power is selectively applied to the solenoids of the engine cutoff means 10 by the 3-position operating switch 60. As shown diagrammatically in FIG. 2, the operating switch 60 has a rotable movable contact 61 that is movable to either the "off," "on," or "reset" position to selectively bridge between stationary power supply contact 62 and one of the stationary contacts 67, 68, and 69 respectively. It is to be understood, however, that conventional switches could be used other than rotary bridging switches. Power is supplied to the power supply stationary contact 62 by wire 63 — which is connected to terminal 23, which in turn is connected to positive battery terminal 15.

When the switch 60 is in the "off" position, contact 61 is in engagement with dummy contact 67, and no power is supplied to the main solenoid 25 since no current flows through wire 66 supplying main solenoid 25. In the "off" position, however, current may still flow from stationary contact 62 through wire 64 to terminal 74 of tilt switch 55. Thus if the vehicle were tipped over whiel the switch 60 were "off," and thus not running, it would have to be moved upright and the switch would have to be reset before it could be operated again. Since no current is supplied to main solenoid 25 with switch 60 in the "off" position, the battery ground connection will be broken by bridging contact 30 being spaced from terminals 18 and 19.

When the switch 60 is in the "on" position, movable contact 61 is in engagement with contact 68, and current is supplied from power supple stationary contact 62 through wire 66 to terminal 77 of pilot relay contact 45 and terminal 76 of relay contact 50. If the contact 45 is closed, power will then be supplied through wire 48 to main solenoid 25, and bridging contact 30 will be moved into engagement with terminals 18 and 19, completing the battery ground connection, and allowing normal operation of the vehicle. The indicator light 70, being connected to main solenoid terminal 27 via wire 71, will indicate that current is flowing through the main solenoid 25.

Should relay contact 45 not be closed (see FIG. 3), indicator light 70 will not go on when switch 60 is moved to the "on" position, and the battery ground connection will not be completed since no current will be flowing through the solenoid 25. To allow further operation of the vehicle, the switch 60 will then have to be moved to the "reset" In the "reset" position, movable contact 61 will be in contact with stationary contact 69, and will thus supply current through wire 65 to first pilot relay solenoid 37. To provide fail-safe operation, the switch contact 61 is spring-biased to the "on" position from the "reset" position so that it cannot remain in the "reset" position and thus interfere with further operation of the tilt switch 55. Momentary energization of coil 37 is all that is needed to move the armature 36 from the position in FIG. 3 to the position in FIG. 2, and thereby close the contact 45. As mentioned above, the armature will stay latched in this position until tilt switch 55 energizes second coil 40 despite any vibration it might be subjected to.

The elements of the engine cutoff means according to the teachings of the present invention having been set forth, the operation will now be described. To normally operate the vehicle, the operator turns the key-operated operating switch 60 to the "on" position. If the indicator light 70 is on, this means that the main solenoid 25 is energized and that the battery (and/or fuel line and electrical circuit) is connected, thus the vehicle may be operated. If the indicator light 70 remains off when the switch 60 is moved to the "on" position, the vehicle cannot be operated until the cutoff means 10 is reset. This is done by turning the switch 60 to the "reset" position against a spring-bias. In the "reset" position, the first coil 37 of the pilot relay 35 is momentarily energized, closing pilot relay contact 45 and allowing energization of the main solenoid 25 — thus allowing normal operation of the vehicle. Should the vehicle now overturn or tilt more than a specified amount, the contacts of tilt switch 55 will be closed, and second pilot relay coil 40 will be energized. This will open contact 45 (and contact 50) and thus cut out the battery and/or the fuel supply and electrical circuit, thus stopping the engine from running and damaging its self. The vehicle may not now be operated until is is up-righted and the engine cutoff reset, even if the switch 60 is moved to the "reset" position when the vehicle is overturned; this is because since the operating switch 60 is spring-biased out of the reset position, even if energization of coil 37 results in contact 45 being closed despite the opposition of still activated coil 40, when the switch 60 is released, it will return from the "reset" position to the "on" position, and since coil 40 would still be energized, the contact 45 would be returned to the open position. Thus, the provision of the spring-bias in switch 60 allows fail-safe operation of the device even if coils 37 and 40 are of the same strength, or even if coil 37 is more powerful.

It will appreciated that the module for the engine cutoff means according to the present invention provides a reliable and compact device that is easily installed in any vehicle with a minimum of time and effort yet provides fail-safe operation even under severe operating conditions, and the engine cutoff means accomplishes all the objectives of the present invention. While the invention has been herein shown and described in what is conceived to be the most practical and preferred embodiments, it is recognized that departures may be made therefrom within the scope of the invention. Thus, the invention is not to be limited to the details disclosed, but is to be accorded the full scope of the claims so as to embrace any and all equivalent structures and device.

What I claim is:

1. An assembly for stopping and preventing a vehicle having an engine compartment and an engine therein from running in the event of vehicle tilt or roll-over, said assembly comprising
   a. a system essential for engine operation,
   b. a means for selectively interrupting and completing said essential system to thereby respectively stop said vehicle engine operation and allow said vehicle engine operation, said means including (i) a movable member selectively movable into and out of engagement with means within said essential system for respectively completing and interrupting said system, said member normally biased out of engagement with said means within said essential system, (ii) a main solenoid operatively associated with said member for moving said member into and out of engagement with said essential system means (iii) a module, said module comprising a unitary assembly of
   a pilot relay operatively associated with said main solenoid, said pilot relay including an armature operatively connected to relay contact, and first and second solenoids acting in opposition on said armature to move said armature into either a first or a second position respectively, said armature remaining latched in the position to which it is moved until acted upon by the other solenoid,
   a tilt switch operatively associated with said second solenoid for providing energization of said second solenoid when said vehicle is tilted more than a predetermined amount, said tilt switch always connected to a source of electircal power, and
   a plurality of terminals for facilitating electrical connection between said pilot relay and said tilt switch, and between said pilot relay and tilt switch and of the components of said means for selectively interrupting and completing said essential system, and (iv) a 3-position operating switch having "off", "on", and "reset" positions, said operating switch having a contact thereof connected to a source of electrical power, said switch in the "off" position thereof supplying no current from said source to said relay contact, said switch in the "on" position thereof supplying current from said source to said relay contact, and said switch in the "reset" position thereof supplying current from said source to said first solenoid.

2. An assembly as recited in claim 1 further comprising means for biasing said operating switch from said "reset" position to said "on" position to prevent said switch from remaining in said "reset" position after an operating force for moving said switch into said position has been removed.

3. An assembly as recited in claim 1 wherein said module further comprises a printed circuit board for mounting said terminals, pilot relay, and tilt switch, and means are provided for encapsulating said printed circuit board and means mounted thereon, only portions of said terminals extending through said encapsulating means.

4. An assembly as recited in claim 3 wherein said encapsulating means comprises an epoxy potting compound.

5. An assembly as recited in claim 3 further comprising means for mounting said module at any convenient location in said vehicle either closely adjacent to or remote from the rest of said means for selectively interrupting and completing said essential system.

6. An assembly as recited in claim 1 further comprising an indicating means for indicating whether or not said main solenoid is energized.

7. An assembly as recited in claim 1 wherein said system essential for engine operation is an electrical circuit of said vehicle, and wherein said movable member is a movable bridging contact and said means within said essential system for cooperating with said bridging contact includes two spaced contacts at a break in said electrical circuit.

8. An assembly as recited in claim 1 wherein said system essential for engine operation is a fuel supply system for said engine.

9. An assembly as recited in claim 1 wherein said system essential for engine operation is a battery ground connection of said vehicle engine, and wherein said movable member includes a movable bridging contact, and wherein said means within said essential system includes a break in said battery ground connection, having two spaced terminals.

10. An aassembly as recited in claim 1 wherein said tilt switch is a mercury switch having a damping means associated therewith.

11. An assembly as recited in claim 1 wherein said module and said main solenoid are mounted in a housing and said operating switch is mounted on said housing, said housing being mounted within the engine compartment of said vehicle.

* * * * *